United States Patent [19]

Allen

[11] Patent Number: 5,203,464

[45] Date of Patent: Apr. 20, 1993

[54] STORAGE RACK SYSTEMS

[75] Inventor: Donald R. Allen, Frenchtown, N.J.

[73] Assignee: Frazier Industrial Company, Long Valley, N.J.

[21] Appl. No.: 609,152

[22] Filed: Nov. 5, 1990

[51] Int. Cl.⁵ .............................................. A47F 5/00
[52] U.S. Cl. .................................... 211/151; 211/59.2
[58] Field of Search ............... 211/151, 59.2; 414/276, 414/286

[56] References Cited

U.S. PATENT DOCUMENTS

| | | | |
|---|---|---|---|
| 4,341,313 | 7/1982 | Doring | 211/151 |
| 4,462,500 | 7/1984 | Konstant et al. | 211/151 |
| 4,773,546 | 9/1988 | Konstant | 211/151 |
| 4,915,240 | 4/1990 | Konstant | 211/151 |
| 4,949,852 | 8/1990 | Allen | 211/151 |
| 4,955,489 | 9/1990 | Allen | 211/151 |

Primary Examiner—Alvin C. Chin-Shue
Assistant Examiner—Sarah A. Lechok
Attorney, Agent, or Firm—Joseph W. Molasky & Assocs.

[57] ABSTRACT

Storage rack systems having a plurality of storage bays adapted to store pallet loads that are multiple pallets deep are disclosed. Each of the storage rack systems includes an interlocked cart assembly constructed and arranged to move along the same track of a pair of track means, the interlocked cart assembly including a first cart movable along said track between a forward position and a back position and a second cart interlocked with said first cart and movable along said track between a forward position overlying the forward position of said first cart and a back position one pallet length farther back then said back position of said first cart.

8 Claims, 9 Drawing Sheets

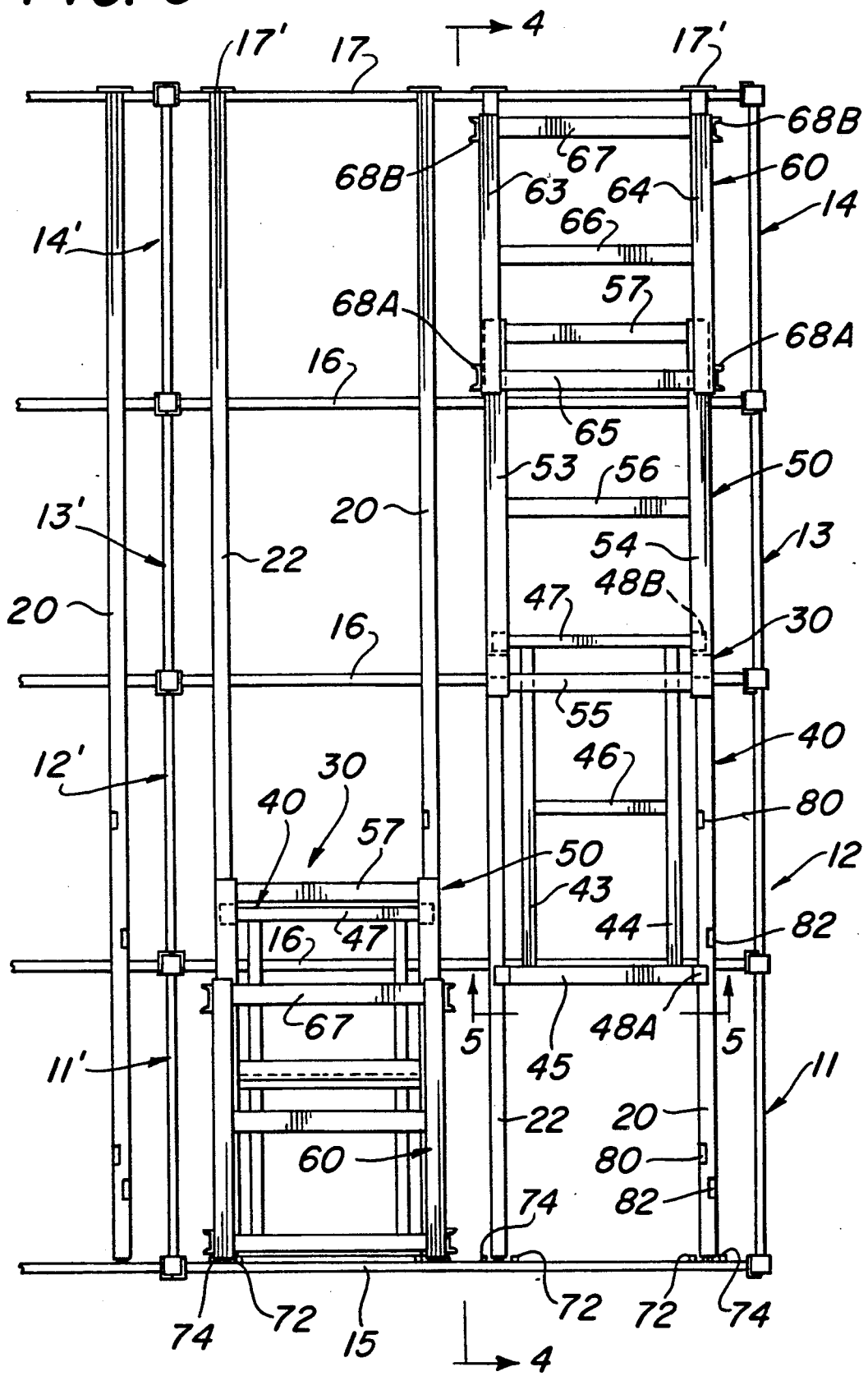

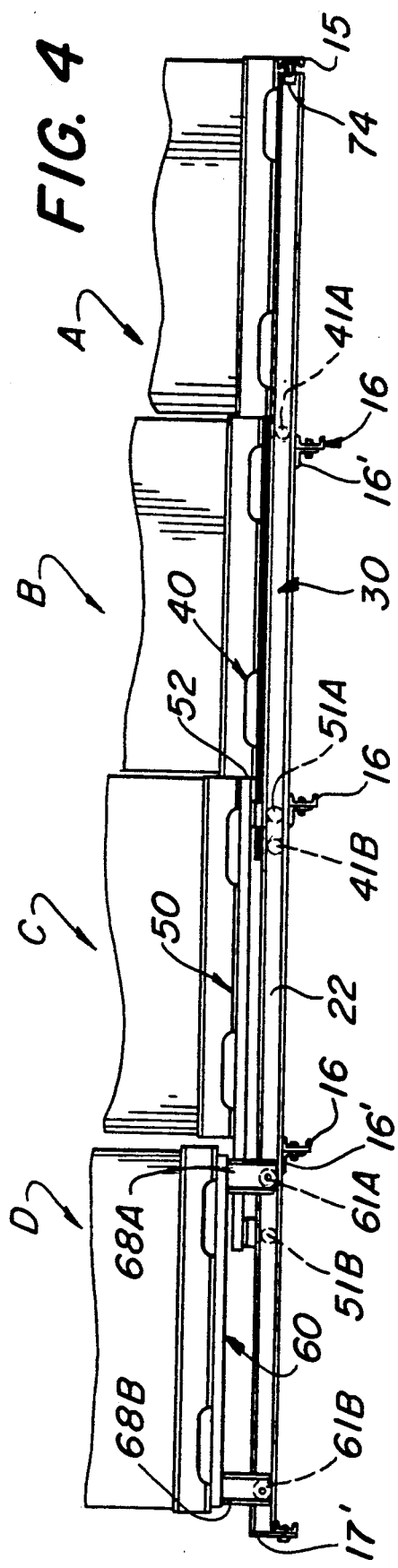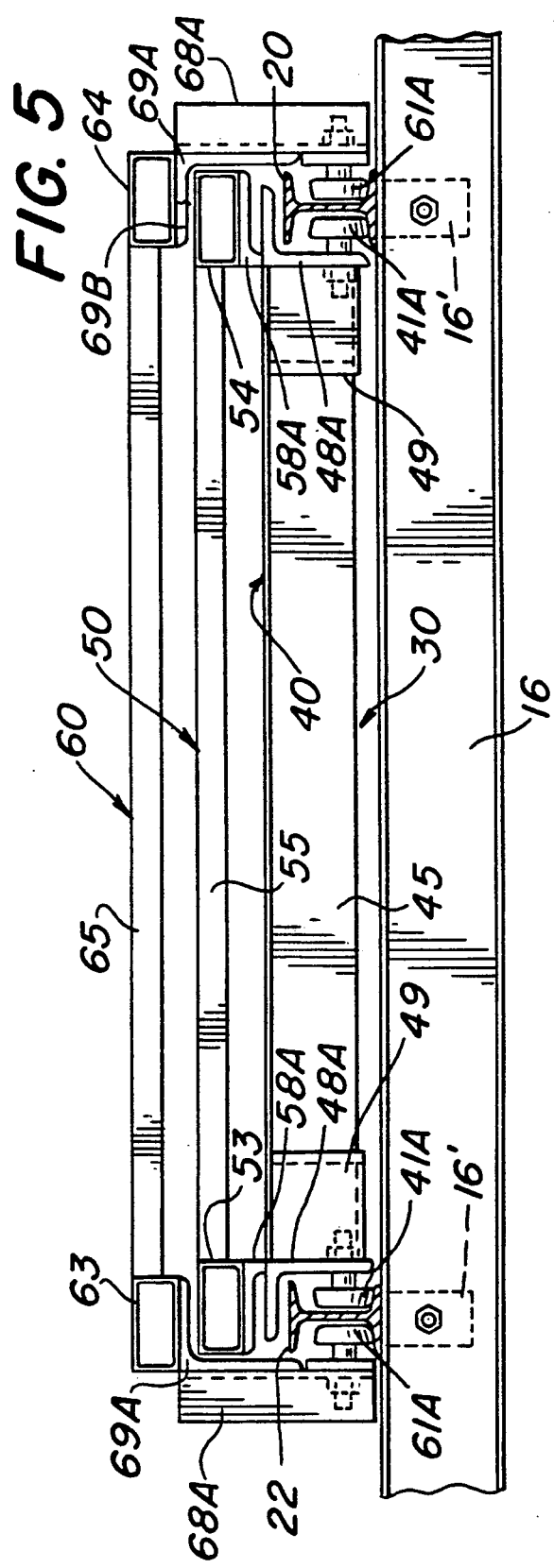

FIG. 6
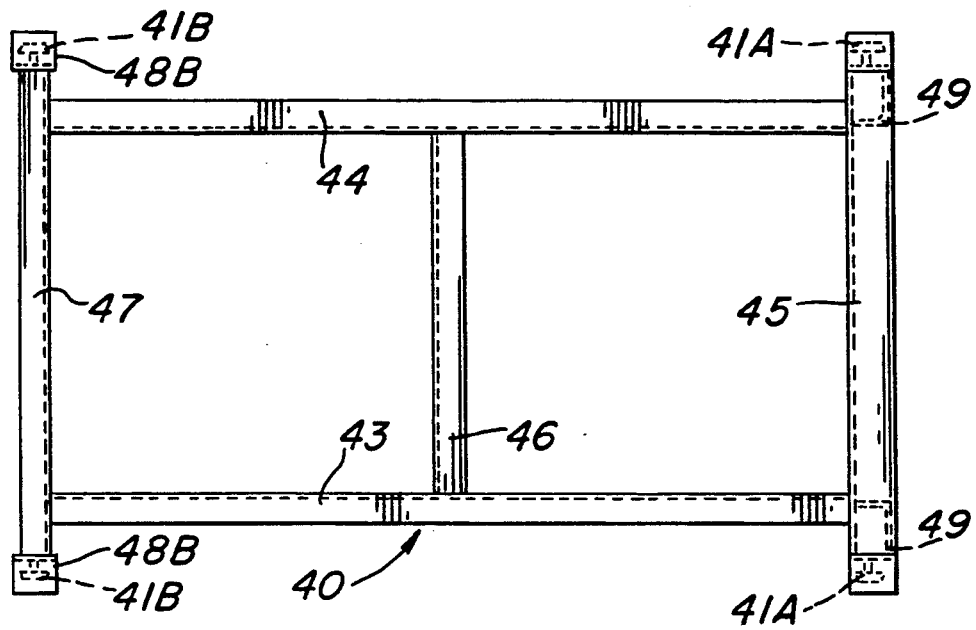
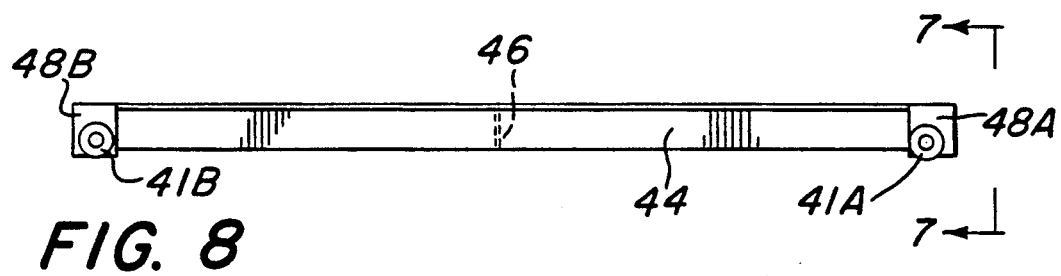
FIG. 8
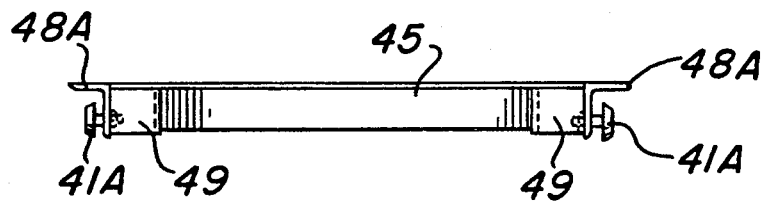
FIG. 7

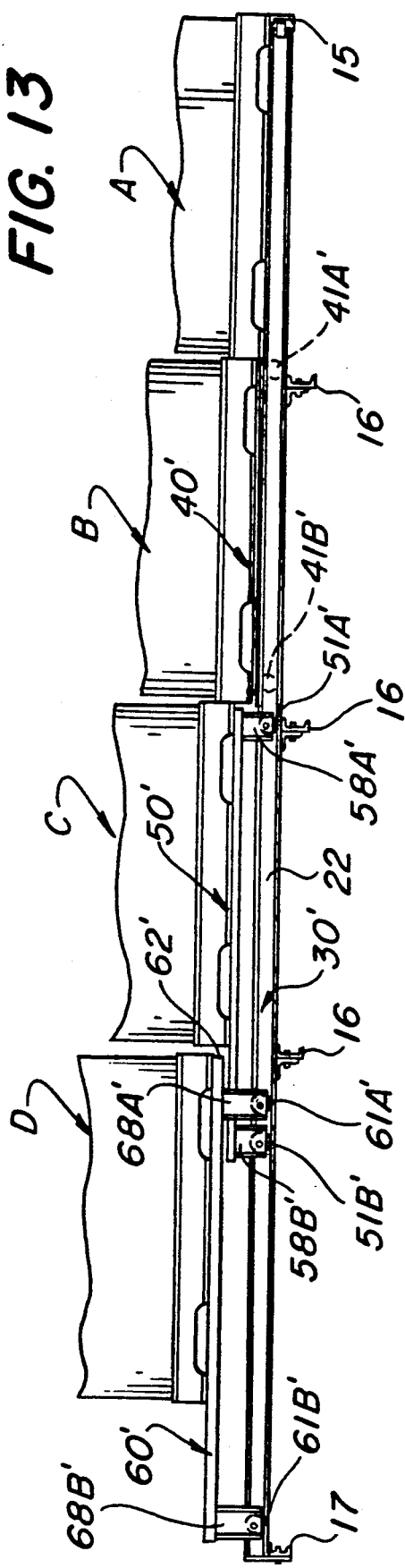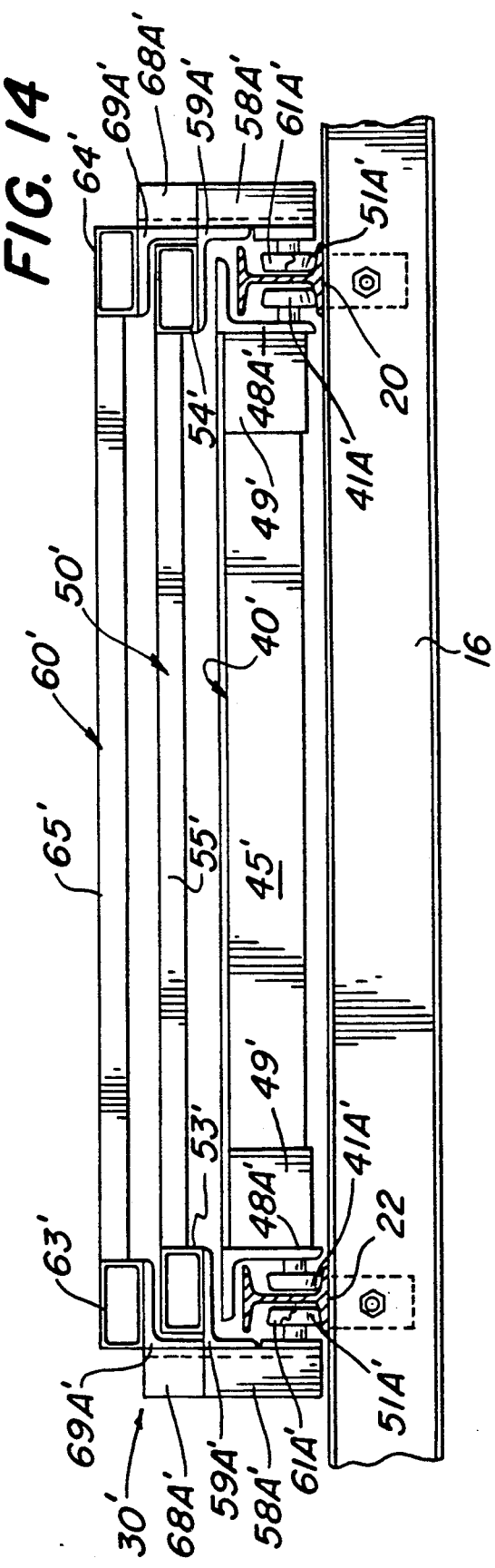

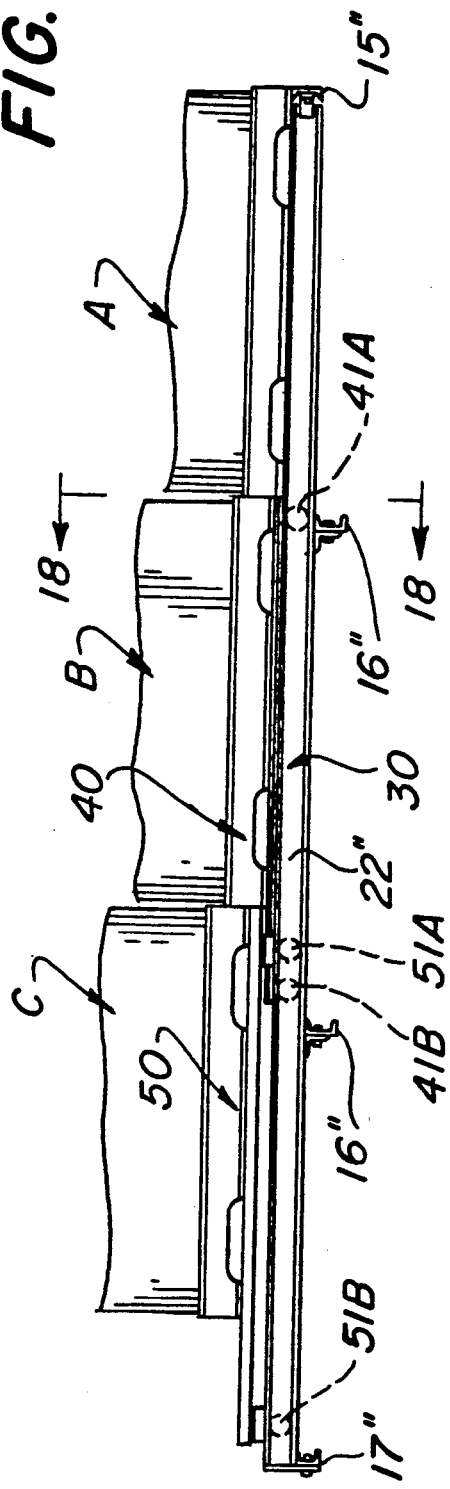
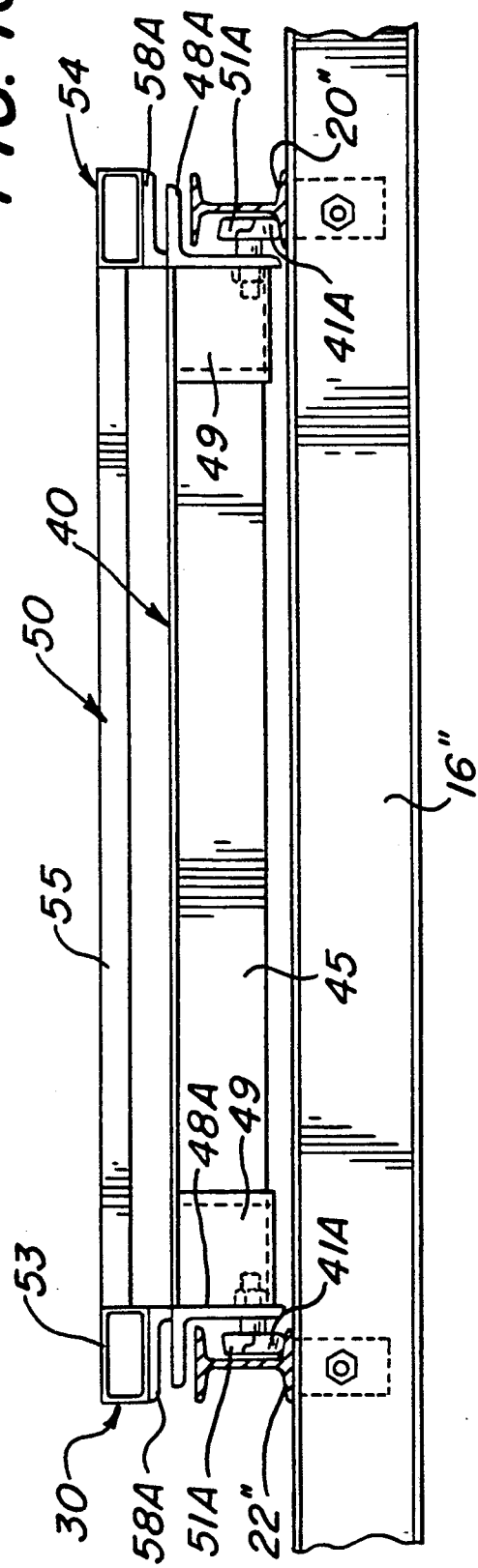

STORAGE RACK SYSTEMS

BACKGROUND OF THE INVENTION

1. Field of the Invention

This invention relates generally to storage rack systems for articles loaded on pallets of the type adapted to be handled by lift trucks and, more particularly, to storage rack systems of the push-back type.

2. Description of the Prior Art

Push-back storage systems are known in the art with a two-deep system being in use since the late 1950's, this system being manufactured by Frazier Industrial Company. More recently, three-deep and four-deep systems are known in the art. In my application Ser. No. 233,122, filed Aug. 12, 1988, now U.S. Pat. No. 4,955,489 there is disclosed a storage rack system of the push-back type, and reference is made to the prior art cited in said prior application. In my application Ser. No. 406,723, filed Sep. 13, 1989, now U.S. Pat. No. 4,949,852 there is disclosed three-deep and four-deep systems having a double cart assembly wherein a large cart rides on the tracks and a small cart is carried by and movably mounted on the large cart.

Typical of the prior art are the storage rack systems shown in U.S. Pat. Nos. 4,341,313 and 4,773,546 wherein there is disclosed a storage rack system to provide for the storage of three pallets deep.

SUMMARY OF THE INVENTION

It is the general object of the invention to provide a storage rack system for storing pallet loads of multiple pallets deep comprising a construction that involves a minimum cost in both manufacture and installation.

Another object of the invention is to provide a storage rack system of the indicated type which incorporates and interlocked cart assembly comprising a first cart movable along a track between a forward position and a back position and a second cart interlocked with the first cart and movable along the same track on which the first cart moves between a forward position overlying the forward position of said first cart and a back position located at a depth one pallet farther back than the back position of said first cart.

Other objects and features of the invention will become apparent from the detailed description set forth hereafter.

DETAILED DESCRIPTION OF THE DRAWINGS

FIG. 3 is a plan view of part of a storage rack system in accordance with the invention with the pallet supporting carts in typical pallet storing positions.

FIG. 4 is a sectional view taken generally on line 4—4 of FIG. 3 and showing the pallet supporting carts on the righthand side of FIG. 3 with pallets added for illustrative purposes.

FIG. 5 is a sectional view taken generally on line 5-5 of FIG. 3.

FIGS. 6, 7 and 8 are plan, front and side views, respectively, of a first cart of the interlocked cart assembly.

FIG. 13 is a sectional view taken generally on line 13—13 of FIG. 12 with the pallets added for illustrative purposes.

FIG. 14 is a sectional view taken generally on line 14—14 of FIG. 12.

FIG. 17 is a side elevational view of a pallet supporting cart assembly for use in the framework shown in FIGS. 15 and 16 for the storage of three pallets deep.

FIG. 18 is a sectional view taken generally on line 18—18 of FIG. 17 and is a front elevational view of the carts shown in FIG. 17 with the pallets being deleted for clarity of illustration purposes.

DETAILED DESCRIPTION OF THE PREFERRED EMBODIMENTS

Figure 1:
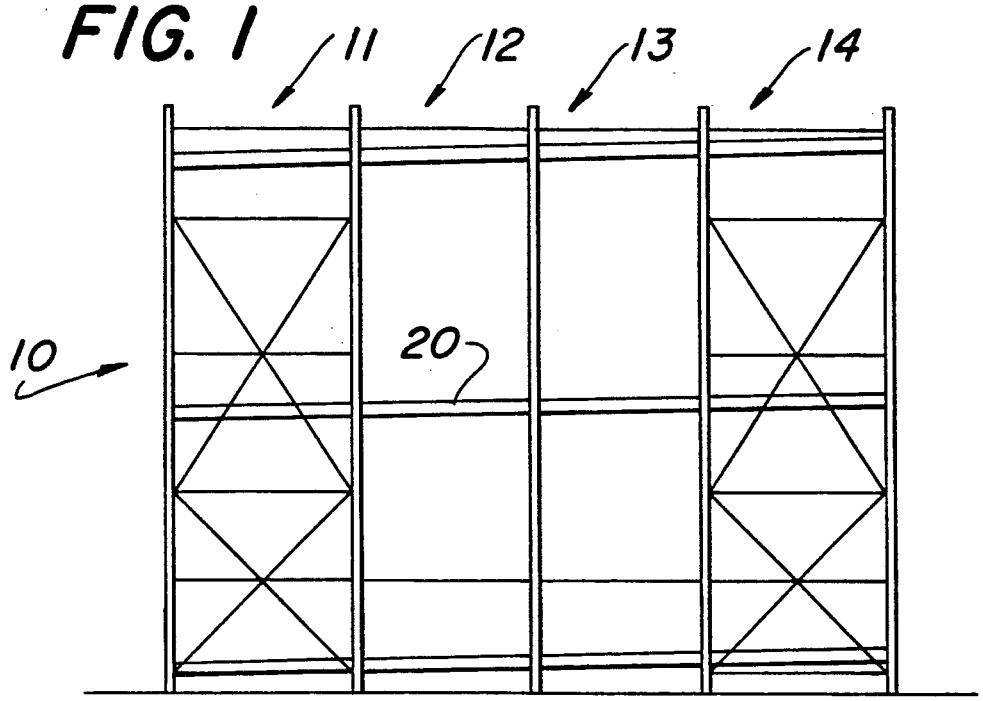
FIG. 1 is a side elevational view showing a framework for a storage rack system in accordance with the invention for the four pallets deep.
Figure 2:
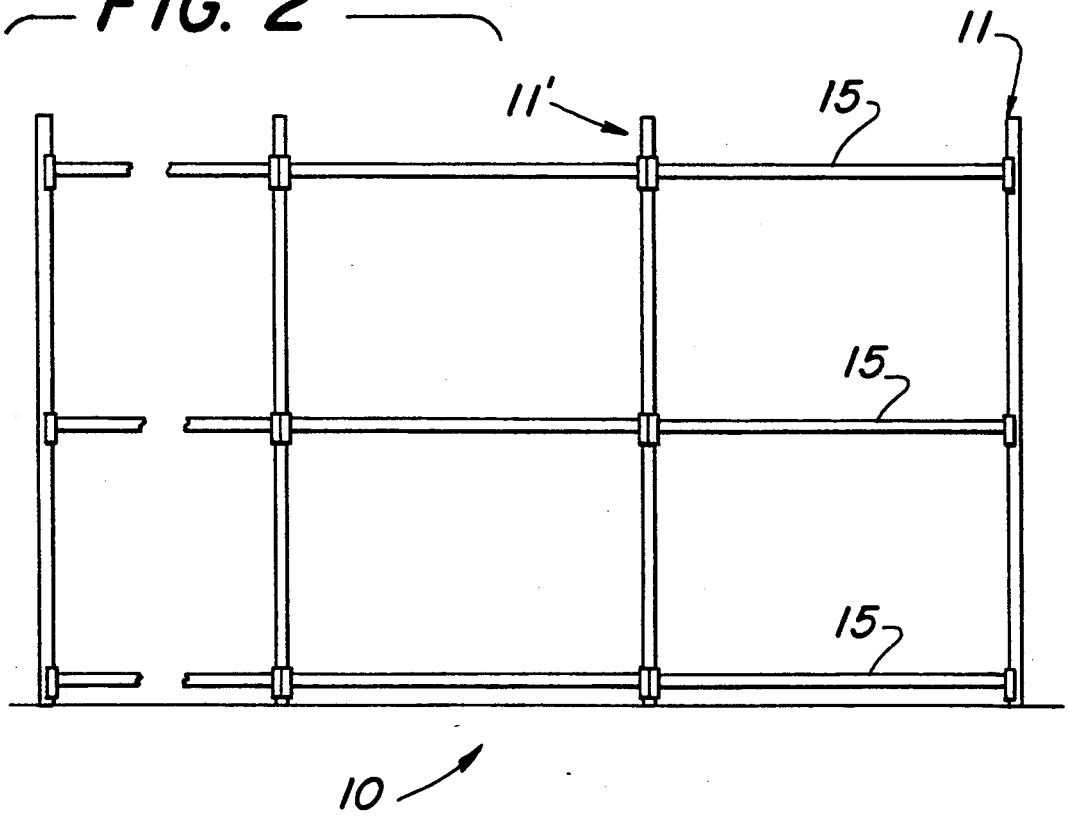
FIG. 2 is a front elevational view of the framework shown in FIG. 1 showing a plurality of storage bays defined by vertical and horizontal shelf beams.

In FIGS. 1-11 there is shown a storage rack system in accordance with the invention. This system comprises a framework providing a plurality of storage bays each of which is defined by a plurality of vertical uprights and horizontal shelf beams constructed and arranged in a generally conventional arrangement, such as, for example, the storage racks manufactured by Frazier Industrial Co. The framework 10 shown in FIGS. 1 and 2 has various parts thereof omitted for the sake of clarity of illustration and is shown in more detail in said U.S. Pat. Nos. 4,949,852 and 4,955,489. Each of the storage bays, which are best illustrated in FIG. 2, is constructed of a depth to provide storage for four pallets deep and of a width to accommodate two rows of pallets. To this end, there are provided four vertically extending upright frames indicated at 11, 12, 13 and 14, only the frames on the right side of the storage bays being shown in FIG. 1. As is conventional in the art, each of the upright frames is comprised of a pair of upright columns joined by horizontally extending ties and, where needed, crossbrace members, this frame structure being conventional in the art and being employed in the storage racks of Frazier Industrial Co. Each of the right side upright frames 11-14 is connected with a corresponding upright frame 11'-14' on the left side of a storage bay by means of a plurality of horizontal shelf beams including a front shelf beam 15, three interior shelf beams 16 and a rear shelf beam 17. The interior shelf beams 16 are connected, by means of bolts and connectors, at their ends with aligned columns of the upright frames 11-14 and 11'-14'. This connection design is conventional, the arrangement of the upright frames and horizontal shelf beams being described in detail in said prior patents and serves to provide support means for the pallets containing the stored loads and to support the track means and carts for positioning the pallet loads in the storage bays. It will be apparent that each storage bay is of a size to contain as many as two rows of pallets each four deep.

For each row of pallets there is provided a pair of associated track means 20 and 22 extending from the front to the back of the storage bay along the depth thereof. Each pair of associated track means 20 and 22 is spaced apart across the width of the storage bay as is shown in FIG. 3. Each of the track means 20 and 22 is comprised of a structural member having an I-shaped cross-section. Each structural member of the track means 20 and 22 is supported on and secured to a shelf beam in a conventional manner as is known in the art and described in detail in said prior patents. Briefly, each structural member is bolted to a front shelf beam 15 by means of angle brackets and is supported on an interior shelf beam 16 and are secured thereto by brackets 16'. The rear shelf beam 17 is mounted so the structural members forming the track means 20 and 22 run over the top thereof and are securing thereto by the use of a plate 17' that runs behind the structural member and the rear shelf beam 17 as is discussed in said prior patents.

Each pair of associated track means 20 and 22 is adapted to support an interlocked cart assembly 30 for guiding the same for movement along the depth of the storage bay as will be described hereafter. Interlocked cart assembly 30 comprises a first cart 40 mounted for movement along said track means 20 and 22 between a forward and a back position and a second cart 50 mounted for movement along said track means 20 and 22 between a forward and a back position. Referring to FIG. 3, the forward position of the interlocked cart assembly 30, and the carts 40 and 50 thereof is shown in the lefthand row of the storage bay shown in this figure, and the back positions of the carts 40 and 50 of the interlocked cart assembly 30 are shown in the righthand row of the storage bay shown in this figure.

The first cart 40 includes a rectangular frame formed of a plurality of structural members welded together, as best shown in FIGS. 6 to 8. The first cart frame comprises a pair of side structural angles 43 and 44, a front structural angle 45, a middle structural angle 46 and a rear structural angle 47. Side angles 43 and 44 are welded at their ends to front angle 45 and rear angle 47 at locations spaced inwardly from the end portions thereof, as is best shown in FIG. 6. Middle angle 46 extends between and is welded at its ends to side angles 43 and 44. A pair of angle brackets 48A are welded to the ends of front angle 45 in the arrangement shown in FIGS. 6–8 to provide a horizontally extending leg portion extending outwardly from the upper leg portion of their associated end of front angle 45. A pair of angle brackets 48B are welded to the ends of rear angle 47 in an arrangement whereby a horizontal leg portion thereof extends outwardly from the upper leg portion of their associated end of rear angle 47. There are provided two bearing-type wheel assemblies mounted on each side of the first cart frame to provide four rolling supports for the cart 40, the front wheel assembly on each side being indicated at 41A and the rear wheel assembly on each side being indicated at 41B. The construction of the wheel assemblies 41A and 41B and their mounting on the first cart frame will be described more fully hereafter. As best shown in FIG. 5, the wheel assemblies 41A and 41B ride on the inwardly facing tapered bottom flange portion of the I-shaped structural members comprising the track means 20 and 22. The frame for cart 40 is of a size so as to be able to support a pallet load, as indicated by the pallet load B in the arrangement shown in FIG. 4.

Figure 9:
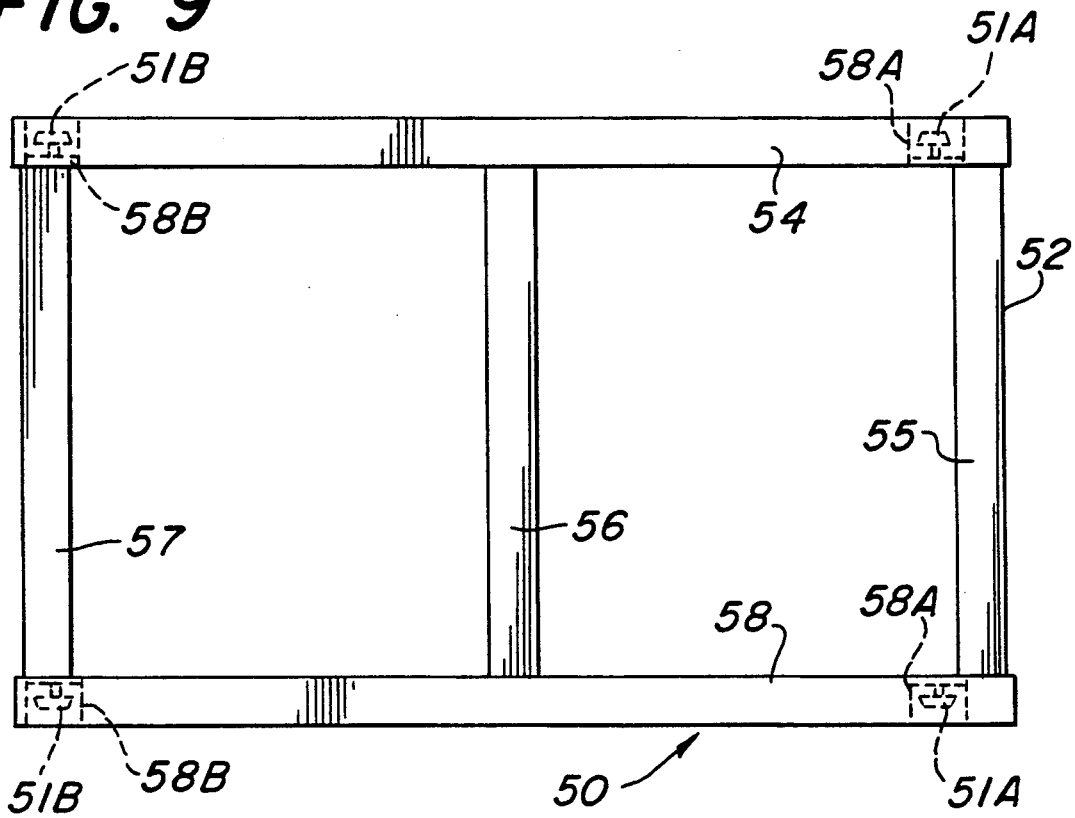
FIGS. 9, 10 and 11 are plan, front and side views, respectively, of a second cart of the interlocked cart assembly.
Figure 11:
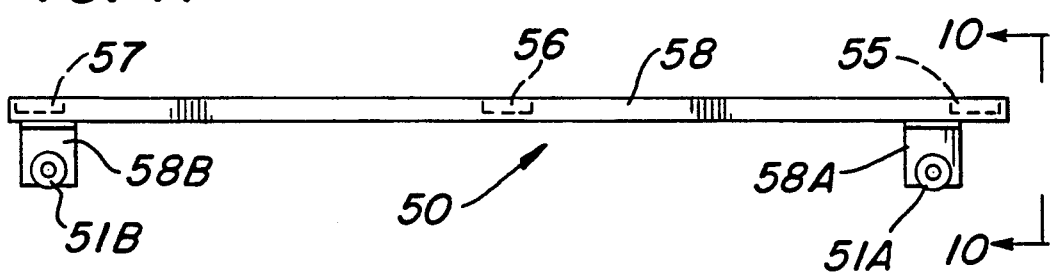
Figure 10:
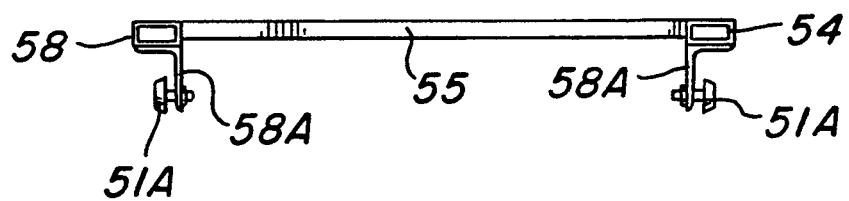

The second cart 50 is manufactured as an independent unit and includes a rectangular frame for providing support for a loaded pallet, a plurality of wheel assemblies 51A and 51B on each side of the cart frame and means for supporting each of the wheel assemblies 51A and 51B to make rolling contact with the track provided by the track means 20 and 22 as cart 50 moves along the depth of the storage bay between a forward and a back position. Thus, the second cart 50 includes a rectangular frame formed of five structural members welded together as best shown in FIGS. 9-11. Cart 50 comprises a pair of side tubes 53 and 54, a front tube 55, a middle tube 56 and a rear tube 57. A pair of bearing-type wheel assemblies 51A and 51B, respectively, are welded at the front and rear ends of side tubes 53 and 54, so as to provide four rolling supports for the second cart 50. As best shown in FIG. 11, the front wheel assemblies 51A are mounted to be spaced rearwardly a short distance from the front end of the cart 50 for a purpose which will be described more fully hereafter. The second cart wheel assemblies 51A and 51B ride on the inwardly facing tapered bottom flange portion of the I-shaped structural members forming the track means 20 and 22 in a manner similar to the first cart wheel assemblies 41A and 41B. The frame for cart 50 is of a size so as to be able to support a pallet load as indicated by the pallet load C in the arrangement shown in FIG. 4.

The wheel assemblies 41A and 41B for the first cart 40 are mounted on the vertically extending leg portions of the angle brackets 48A and 48B by conventional means, as is described in said patents. The mounting means comprises horizontally extending holes punched in the vertically extending legs of brackets 48A and 48B with each hole being used to mount a wheel assembly. Each of the wheel assemblies has a horizontally extending axle having a threaded reduced diameter portion extending on a horizontal axis through the hole in the vertically extending side leg of the brackets 48A and 48B. The reduced diameter portion of the axle extends through a pair of washers on the opposite sides of said vertically extending legs and is threadedly engaged with a nut in an arrangement whereby the axle is secured in place to extend on a horizontal axis. A wheel rim is rotatably supported on a hub of the axle by means of roller bearing means positioned between the hub and the wheel rim by conventional sealed roller bearing construction. The wheel rim is formed with a tapered outer or rolling surface, the taper angle being the same as the taper angle formed on the bottom flange portion of the structural member forming track means 20 and 22.

It is noted that the wheel assemblies 41A and 41B and the wheel assemblies 51A and 51B are of the same construction, the latter being mounted on the vertical legs of brackets 58A and 58B in the same general way that the former are mounted, as discussed above.

Each of the carts 40 and 50 of the interlocked cart assembly 30 is mounted into the pair of associated track means 20 and 22 by the use of a pair of cutouts 80 formed in the upper flange of the structural member forming track means 20, said cutouts 80 being shown in FIG. 3. The cutouts 80 are located to correspond to the wheel assemblies 41A and 41B on the first cart 40 and also the wheel assemblies 51A and 51B on the second cart 50. Actual field insertion is achieved by a procedure well known in the art whereby a cart is tilted at an angle and the left side wheels are slipped into the lefthand track means 22 and the cart is maneuvered so that the cart wheels can then be dropped through the track cutouts 80 into track means 20.

In accordance with the invention, the first and second carts 40 and 50 are interlocked by having the front wheel assemblies 51A and the second cart 50 being positioned to ride on the track means 20 and 22 at a location between the front wheel assemblies 41A and the rear wheel assembles 41B of the first cart 40. This interlocked condition is achieved by the procedure of inserting the cart assemblies 40 and 50 into the associated track means 20 and 22 as described above.

The interlocked cart assembly 30 is constructed and arranged so that the forward position of the second cart 50 overlies the forward position of the first cart 40, as is shown in the lefthand side of FIG. 3, and the back position of the second cart 50 is located a pallet depth rearwardly of the back position of the first cart 40, as is shown in the righthand portion of FIG. 3 and in FIG. 4. In order to permit the interlocked cart assembly 30 to move between the above-described positions, the first cart 40 has its side angles 43 and 44 spaced inwardly of the side tubes 53 and 54 and the mounting means for wheel assemblies 51A and 51B of the second cart 50 to thereby provide clearance between the frame of cart 40 and the front wheel assemblies 51A and 51B during the relative movement between said carts 40 and 50 along track means 20 and 22. This is shown in FIG. 3, wherein it can be seen that the side angles 43 and 44 of first cart 40 are spaced inwardly of the side tubes 53 and 54 and the wheel assemblies 51A and their mounting means of second cart 50. In order to prevent the first cart 40 from falling between the track means 20 and 22 in the event of a breakage of the wheel assemblies 41A and 41B, each of the angles brackets 48A and 48B has a horizontal leg portion extending above the track means 20 or 22 associated therewith, as is shown in FIGS. 3 and 5.

It is to be noted that the front wheel assemblies 51A are spaced rearwardly of the forward end 52 of the second cart 50 so that said front wheel assemblies 51A avoid contact with the front wheel assemblies 41A of the first cart when said first and second carts 40 and 50 are in the forward positions thereof. This insures that the front end 52 of cart 50 can be positioned at the front shelf 15 in the forward position of cart 50 so that it is properly positioned to have a pallet load delivered to and removed therefrom at the entry of the storage bay.

The track means 20 and 22 also include a second track provided by an outwardly facing flange and constructed and arranged to support a third cart 60 and to guide said cart for movement along the depth of the storage bay in essentially the same manner as described above with respect to the interlocked carts 40 and 50. Thus, the third cart 60 includes a frame providing support for a pallet load, front and rear wheel assemblies 61A and 61B, respectively, on each side of said third cart frame and means for supporting each of said third cart wheel assemblies to make rolling contact with the second track of each track means 20 and 22 as said third cart 60 moves along the depth of the storage bay between a forward and a back position. The forward position of the third cart 60 is located at the entry end of the storage bay overlying the second cart 50 of the interlocked cart assembly 30 and the back position of said third cart is located four pallets deep from the entry end of said storage bay.

The third cart 60 is essentially identical to cart 50 and includes a rectangular frame formed of five structural members 63-67 welded together as shown in the drawings.

Thus, there are provided, as best shown in FIG. 3, a pair of side structural members 63 and 64, a front structural member 65, a middle structural member 66 and a rear structural member 67 extending between the side members 63 and 64. The cart 60 is adapted to support a pallet load, as indicated by the pallet load D in FIG. 4. As shown in FIGS. 4 and 5, there are provided two wheel assemblies 61A and 61B mounted on each side 63 and 64 to provide four rolling supports for the third cart 60, wheel assemblies 61A and 61B being mounted on vertical channels 68A and 68B, respectively, which are mounted on the vertical legs of angle brackets 69A and 69B, respectively, which are mounted on the underside of sides 63 and 64 at the front and rear ends thereof. As is best shown in FIG. 5, the third cart wheel assemblies 61A and 61B ride on the outwardly facing tapered bottom flange portion of the I-shaped channel members forming track means 20 and 22. As shown in FIGS. 6 and 7, first cart 40 of the interlocked cart assembly 30 has a pair of plates 49 at the forward end thereof, said plates 49 being spaced slightly inwardly from the track means 20 and 22, as is best shown in FIG. 5. Also, the forwardly facing flanges of channels 68A extend transversely of cart 60 at locations outwardly of the track means 20 and 22 as is shown in FIG. 5. There is provided a bumper 72 for contacting each of the bumper plates 49 on the first cart 40. Bumpers 72 are conventional in the art and described in detail in my prior patents. Briefly, each bumper 72 comprises a rubber stop member in the form of a hollow cylinder which is mounted on the rearwardly projecting end of a bolt. The bumpers 72 are arranged to contact the bumper plates 49 on the first cart 40 of the interlocked cart assembly 30 at a predetermined position at the forward end of the storage bay so as to position the interlocked cart assembly 30 in its forward position immediately adjacent the front shelf of the storage bay.

There is also provided bumper means for holding the third cart 60 in its forward position at the entry end of each storage bay. To this end, there is provided a bumper 74 for contacting each of front flanges of channels 68A on the third cart 60. The bumpers 74 are identical in construction to bumpers 72. Bumpers 74 are arranged to contact the flanges of channels 68A on third cart 60 at a predetermined position at the forward end of the storage bay so as to position third cart 60 in its forward position overlying the second cart 50 of the interlocked cart assembly 30 in the positions as described above.

Cart 60 is mounted into the pair of associated track means 20 and 22 by the use of a pair of cutouts 82 formed in the upper flange of the structural member forming track means 20, said cutouts 82 being shown in FIG. 3. The cutouts 80 are located to correspond to the wheel assemblies 61A and 61B on the cart 60. Actual field insertion is achieved by a procedure well known in the art whereby a cart is tilted at an angle and the left side wheels are slipped into the lefthand track means 22 and the cart is maneuvered so that the cart wheels can then be dropped through the track cutouts 82 into track means 20.

The track means 20 and 22 are mounted on the shelf beams of the framework so that they extend with a slight inclination toward the entry end of a storage bay. As is described in detail in said prior patents, the inclination is achieved by the accurate locating of the position of the supporting structure for the track means and is typically about ⅛ inch for each twelve inches of length.

As is apparent from a consideration of the drawings, the forward positions of the carts 40 and 50 of the interlocked cart assembly 30 and third cart 60 are located at the entry end of the storage bay, the back position of the first cart 40 being two pallets deep from the entry end of the storage bay, the back position of the second cart 50 being three pallets deep from the entry end of the storage bay and the back position of the third cart 60 being four pallets deep from the entry end of the storage bay. Thus, each row of the storage bay can store four pallet loads A, B, C and D in an arrangement as best shown in FIG. 4. The front pallet supporting load A is supported on the track means 20 and 22, the pallet supporting load B is supported on the first cart 40 of the interlocked cart assembly 30, the pallet supporting load C is supported on the second cart 50 of the interlocked cart assembly 30 and the pallet supporting load D is supported on the third cart 60.

The pallet loads A, B, C and D will be placed in the position shown in FIG. 4 by a conventional push-back loading technique employing conventional fork trucks, which technique is well known in the art and described in detail in said prior patents. Thus, the first pallet load D to be stored is placed onto the empty third cart 60 which has assumed its position at the entry end of the storage bay as described above. When it is desired to store the second pallet load C in the storage bay, the fork truck approaches the storage rack at an elevation such that the fork truck and the second pallet load C gently nudge the first load D toward the rear, whereby said first load D and the cart 60 supporting the same will be pushed back rearwardly toward the rear of the storage rack up to the point where the fork truck can place the load C onto the empty second cart 50 of the interlocked cart assembly 30. When it is desired to store a third pallet load B, the fork truck with said third load B approaches the storage rack and the pallet load B gently nudges the first two loads C and D toward the rear whereby the loads C and D (and the carts 50 and 60 supporting the same) are pushed back rearwardly toward the rear of the storage rack up to the point where the fork truck can place the load B on the empty first cart 40. When the fourth pallet load A is to be stored, the fork truck with the pallet load A thereon gently nudges the other pallet loads B, C and D supported on the carts 40, 50 and 60, respectively, toward the rear of the storage rack until the fork truck can deposit the fourth load A on the track means 20 and 22 and the front shelf beam 15 at the forward loading position at the entry end of the storage bay. In this manner the row of the storage rack is fully loaded with four pallet loads. In order to unload the four pallet loads, a procedure which is essentially the reverse of the above-described procedure is employed. mounted on the vertical legs of angle brackets 69A and In FIGS. 12-14 there is shown another storage rack system in accordance with the invention for storing four pallets deep, which system is equivalent to that shown in FIGS. 1-11. The system shown in FIGS. 12-14 differs from that shown in FIGS. 1-11 only in that an interlocked cart assembly is constructed and arranged to ride on the outside track of the I-shaped track means 20 and 22 and a lower cart is constructed and arranged to ride on the inside track of track means 20 and 22. Accordingly, in FIGS. 12-14 corresponding parts have been given the same reference numerals as the parts in the embodiment of FIGS. 1-11 with primes added where appropriate.

Figure 12:
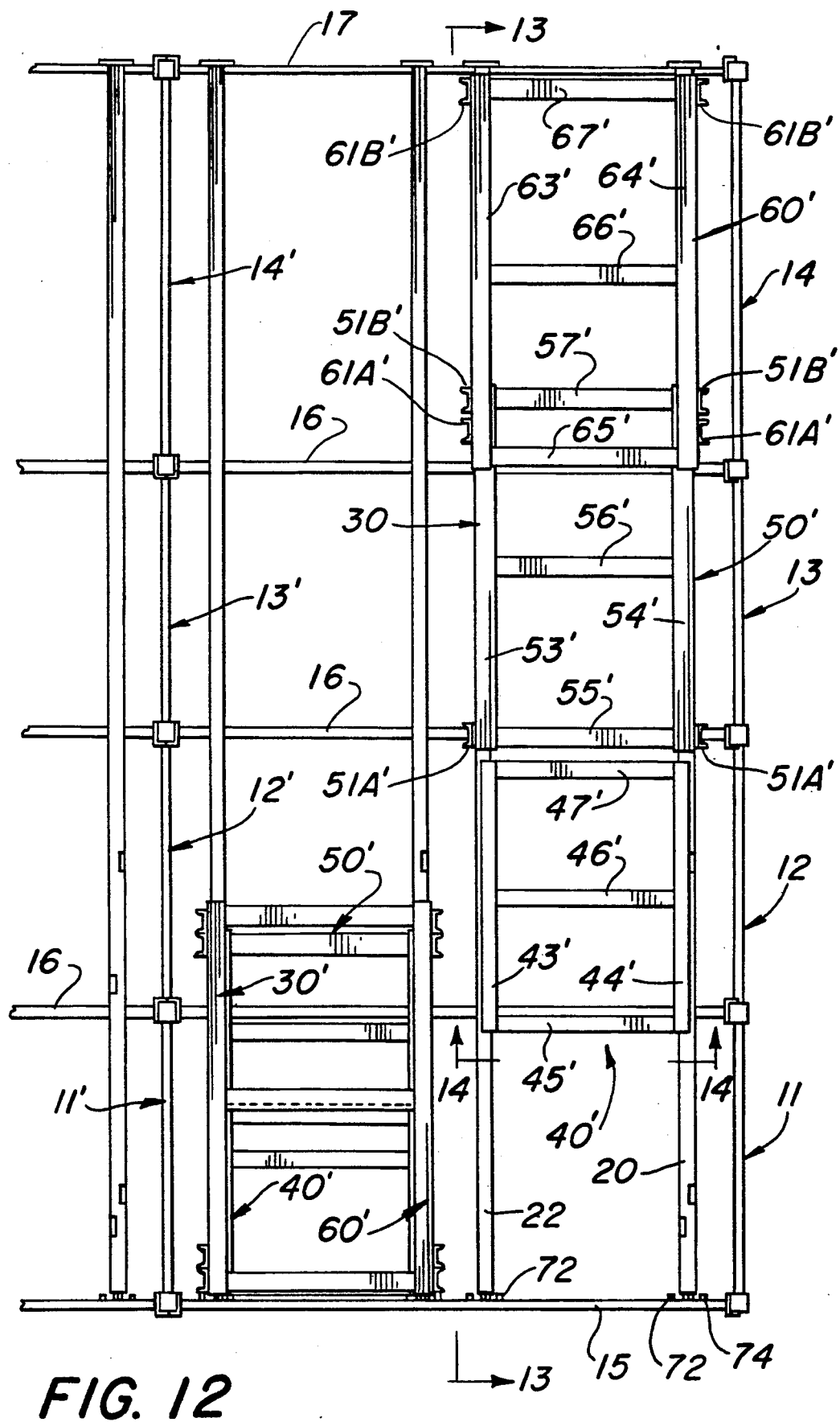
FIG. 12 is a plan view of another embodiment of the invention and illustrates the pallet supporting carts in typical pallet storing positions.
Figure 15:
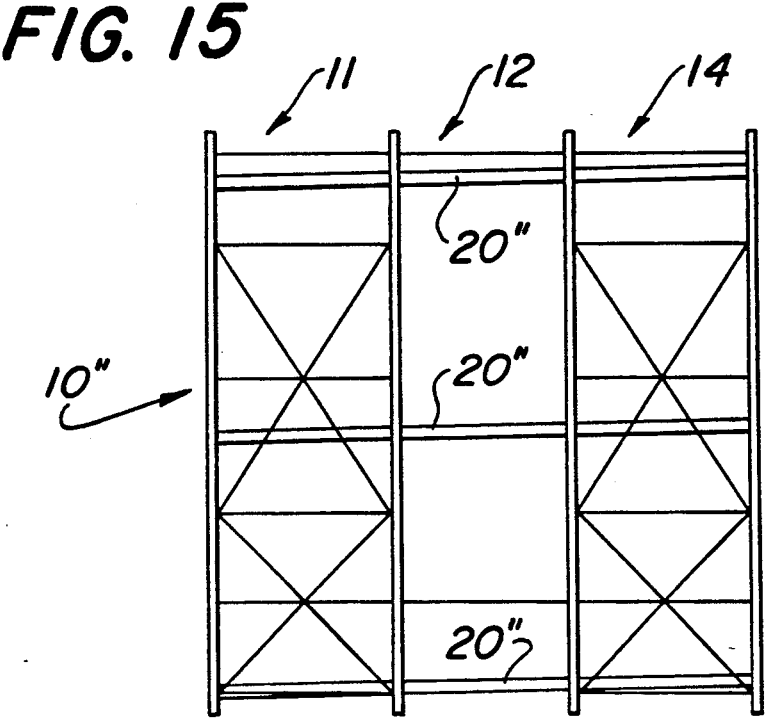
FIGS. 15 and 16 are side and front elevational views similar to FIGS. 1 and 2 but showing a framework for supporting a storage rack system in accordance with the invention for storing three pallets deep.
Figure 16:
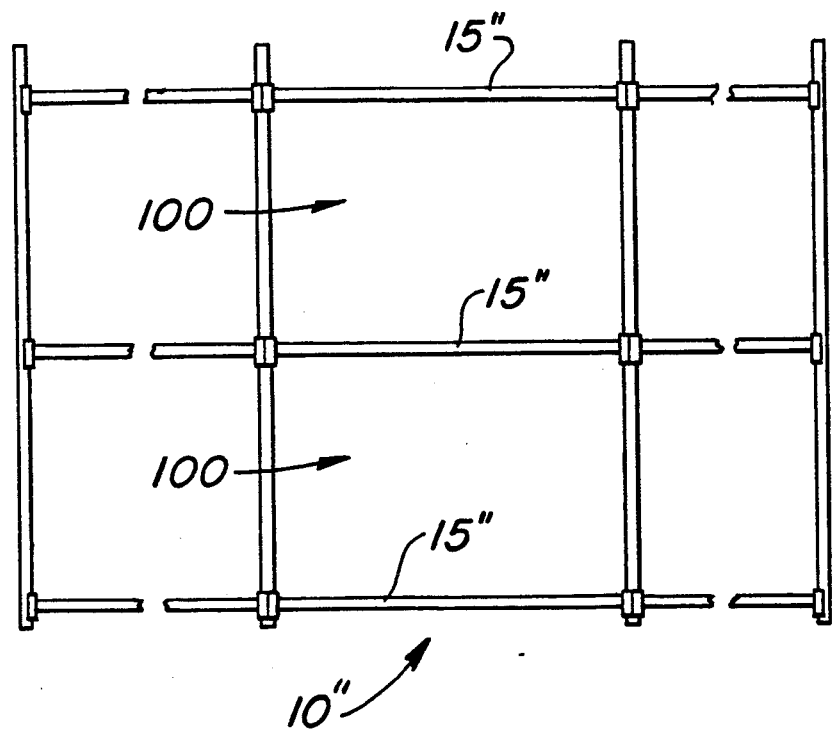

The embodiment shown in FIGS. 12-14 comprises the same framework 10 as the FIG. 1-11 embodiment, which framework 10 provides storage bays containing two pairs of track means 20 and 22 for the storing of two rows of pallets four deep, framework 10 including upright frames 11-14 and 11'-14' as well as shelf beams 15-17. The I-shaped track means 20 and 22 are supported on shelf beams 15-17 in the same manner as described above in the embodiment shown in FIGS. 1-11.

Briefly stated, each pair of associated track means 20 and 22 is adapted to support a lower cart 40' and an intertrack locked cart assembly 30' including a middle cart 50' and an upper cart 60' for guiding said carts for movement along the depth of the storage bay between a forward and a back position. Referring to FIG. 12, the forward position of the carts 40', 50' and 60' is shown in the lefthand row of the storage bay shown in this figure and the back positions thereof are shown in the righthand row of this figure.

The lower cart 40' includes a rectangular frame formed of a plurality of structural angles welded together, the lower cart frame comprising side structural angles 43' and 44', front angle 45', middle angle 46' and rear angle 47'. Front and rear wheel assemblies 41A' and 41B' are mounted on angle brackets 48A' and 48B' mounted on the sides of the lower cart frame in the same manner as described above, there being provided two wheel assemblies mounted on each side to provide four rolling supports for the cart 40'. Lower cart 40' also has a pair of bumper plates 49' welded thereto at the forward end thereof at locations spaced slightly inwardly from the track means 20 and 22 as best shown in FIG. 14.

The interlocked cart assembly 30' comprises a middle cart 50' and an upper cart 60' which are constructed in a manner similar to corresponding carts 50 and 60 described above Thus, cart 50' includes a rectangular frame providing support for a loaded pallet and a plurality of wheel assemblies 51A' and 51B' on each side of the cart frame and means for supporting front and rear wheel assemblies 51A' and 51B' to make rolling contact with the track provided by the track means 20 and 22 as cart 50' moves along the depth of the storage bay between a forward and a back position. Cart 50' includes a rectangular frame formed of five structural tubes welded together, including a pair of side tubes 53' and 54', a front tube 55', a middle tube 56' and a rear tube 57'. Wheel assemblies 51A' and 51B' are mounted on vertical channels 58A' and 58B', respectively, welded to angle brackets 59A' and 59B', respectively, which are welded at the front and rear ends of side tubes 53' and 54' so as to provide four rolling supports for the cart 50'. Wheel assemblies 51A', 51B' ride on the outer bottom flanges I-shaped track means 20 and 22 (FIG. 14).

The upper cart 60' is essentially identical to cart 50' and includes a rectangular frame formed of five structural members welded together as shown in the drawings. There are provided a pair of side tubes 63' and 64', a front tube 65', a middle tube 66' and a rear tube 67'. There are provided two wheel assemblies 61A' and 61B' mounted on each side 63' and 64' to provide four rolling supports for the third cart 60'. Wheel assemblies 61A' and 61B' are mounted on vertical channels 68A' and 68B', respectively, which are welded to the vertical legs of angle brackets 69A' and 69B', respectively, which are welded to the underside of side tubes 63' and 64' at the front and rear ends thereof. As best shown in FIG. 14, the wheel assemblies 61A' and 61B' ride on the outwardly facing tapered bottom flange portion of the I-shaped channel members forming track means 20 and 22.

The frames for the carts 40', 50' and 60' are all of a size so as to be able to support a pallet load, said pallet loads being indicated at B, C and D, respectively.

Each of the carts 40', 50' and 60' is mounted into the pair of associated track means 20 and 22 by the use of cutouts formed on the upper flanges thereof as described above with respect to the embodiment shown in FIGS. 1-11.

In accordance with the invention, the carts 50' and 60' are interlocked by having the front wheel assemblies 61A' of the cart 60' being positioned to ride on the track means 20 and 22 at a location between the front wheel assemblies 51A' and the rear wheel assemblies 51B' of cart 50'. This interlocked condition is achieved by the procedure of inserting the carts 50' and 60' into the associated track means 20 and 22 as described above.

The interlocked cart assembly 30' is constructed and arranged so that the forward position of cart 60' overlies the forward position of cart 50' as is shown in the lefthand side of FIG. 12 and the back position of cart 60' is located a pallet depth rearwardly of the back position of cart 50 as is shown in the righthand position of FIG. 12 and in FIG. 12.

It is noted that the front wheel assemblies 61A' are spaced rearwardly of the forward end 62' of the cart 60 so that said front wheel assemblies 61A' avoid contact with the front wheel assemblies 51A' of cart 50' when said carts 50' and 60' are in the forward positions thereof. It is noted that the forwardly facing flanges of the channels 58A' serve as bumper plates for interlocked cart assembly 30'. The bumper means is shown at 72 and 74 in FIG. 12 and is the same as that described above with respect to FIGS. 1-11.

As is apparent from a consideration of FIGS. 12-14, the forward positions of the carts 40', 50' and 60' are located at the entry end of the storage bay, the back position of cart 40' being two pallets deep from the entry end of the storage bay, the back position of middle cart 50' being three pallets deep from the entry end of the storage bay and the back position of the upper cart 60' being four pallets deep from the entry end of the storage bay. Thus, each row of the storage bay can store four pallet loads A, B, C and D in an arrangement as best shown in FIG. 13. The front pallet supporting load A is supported on the track means 20 and 22, the pallet supporting load B is supported on the lower cart 40', the pallet supporting load C is supported on cart 50' of the interlocked cart assembly 30', and the pallet supporting load D is supported on cart 60' of the interlocked cart assembly 30'.

The pallet loads A, B, C and D will be placed in the position shown in FIG. 7 by the conventional push-back loading technique in the same manner as described above with respect to the embodiment shown in FIGS. 1-11.

In FIGS. 15-18 there is shown a storage rack system in accordance with the invention for storing three pallets deep, which system comprises the same interlocked cart assembly 30 of the storage rack system shown in FIGS. 1-11, the main difference between said systems being that the framework 10" of the system shown in FIGS. 15-18 is constructed for storing three pallets deep whereas the framework 10 of the system shown in FIGS. 1-11 is constructed for storing four pallets deep. Accordingly, in FIGS. 15-18 the same parts have been given the same reference numerals and corresponding modified parts are given the same reference numerals with double primes added.

The embodiment shown in FIGS. 15-18 comprises a framework 10" which provides a plurality of storage bays 100 adapted to contain two pairs of track means 20" and 22" for storing two rows of pallets three deep, framework 10" including upright frames 11, 12 and 14 and 11', 12' and 14' as well as shelf beams 15"-17". The track means 20" and 22" are I-shaped and are supported on shelf beams 15"-17" in the same manner as described above in the embodiment shown in FIGS. 1-11.

Briefly stated, each pair of associated track means 20" and 22" is adapted to support an interlocked cart assembly 30 including a first cart 40 and a second cart 50 for guiding the wheel assemblies 41A, 41B and 51A and 51B of said carts for movement along the depths of the storage bay between a forward and a back position along the inner bottom flanges of track means 20" and 22". As shown in FIG. 11, the carts 40 and 50 of the interlocked cart assembly 30 are adapted to support pallet loads indicated at B and C, respectively.

The carts 40 and 50 are mounted into the pair of associated track means 20" and 22" by the use of cutouts formed in the upper flanges thereof as described above with respect to the embodiment shown in FIGS. 1-11. The carts 40 and 50 are interlocked by having the front wheel assemblies 51A of cart 50 being positioned to ride on the track means 20" and 22" at a location between the front wheel assemblies 41A and the rear wheel assemblies 41B of cart 40. This interlocked condition is achieved by the procedure of inserting the carts 40 and 50 into the associated track means 20" and 22" as described above.

The interlocked cart assembly 30 is constructed and arranged, as described in detail with respect to the embodiment shown in FIGS. 1-11, so that the forward position of cart 50 overlies the forward position of cart 40 and the back position of cart 50 is located one pallet depth rearwardly of the back position of cart 40 as is shown in FIG. 17. More specifically, as shown in FIG. 17, carts 40 and 50 are located at the entry end of the storage bay 100 in their forward positions with the back position of cart 40 being two pallets deep from the entry end of the storage bay 100 and the back position of cart 50 being three pallets deep from the entry end of the storage bay 100. Thus, each row of a storage bay 100 can store three pallet loads A, B and C in an arrangement as shown in FIG. 17. The front pallet supporting load A is supported on the track means 20" and 22", the pallet supporting load B is supported on cart 40 and the pallet supporting load C is supported on cart 50. The pallet loads A, B and C will be placed in the position shown in FIG. 17 by conventional push-back loading technique in the same manner as described above with respect to the embodiment shown in FIGS. 1-11.

What is claimed is:

1. In a storage rack system for storing pallet loads multiple pallets deep having a framework providing a plurality of storage bays each of which is defined by a plurality of vertical uprights and horizontals shelf beams, each of said storage bays comprising:

a pair of track means extending from front to back along the depth of said storage bay and being spaced apart across the width of said storage bay, each track means including at least one track for supporting the wheels of a cart, an interlocked cart assembly movable along said track means and including a first cart including a frame providing support for a pallet load, front and rear wheel assemblies on each side of said first cart frame, and means for supporting each of said first cart wheel assemblies to make rolling contact with said one track of each track means as said first cart moves along the depth of the storage bay between a forward and a back position, and a second cart including a frame providing support for a loaded pallet, front and rear wheel assemblies on each side of said second cart frame, and means for supporting each of said second cart wheel assemblies to make rolling contact with said one track of each track means as said second cart moves along the depth of the storage bay between a forward and a back position, said first and second carts being interlocked by having said first wheel assemblies of said second cart being positioned to ride on said one track of each track means between the front and rear wheel assemblies of said first cart, the forward position of said second cart overlying the forward position of said first cart and the back position of said second cart being located a pallet depth rearwardly of the back position of said first cart, said track means being mounted on said storage bay framework so as to be inclined toward the entry end of said storage bay, with said one tracks being constructed and arranged so that said carts of said interlocked cart assembly are supported so that they tend to roll along said one tracks toward the entry end of said storage bay, each of said track means comprising a channel construction wherein each of said one tracks is provided by an inwardly facing flange on which said wheel assemblies ride, said first cart frame including a pair of support members extending along the depth thereof and forming the sides thereof, said first cart support members being inwardly of said support means for said second cart front wheel assemblies to provide clearance for the relative movement between said second cart and said first cart along said track means, and including a pair of support plates mounted on each side of said frame of said first cart at locations to permit said carts to move along said one tracks between said forward and back positions thereof and extending above said track means to prevent said first cart from falling between said track means.

2. A storage rack system according to claim 1 wherein said forward position of said first cart being located at the entry end of the storage bay, said forward position of said second cart being located at the entry end of said storage bay overlying said first cart, said back position of said first cart being located two pallets deep from the entry nd of the storage bay, and said back position of the second cart being located three pallets deep from the entry end of the storage bay.

3. A storage rack system according to claim 2 wherein each of said pair of track means includes a second track provided by an outwardly facing flange and including a third cart including a frame providing support for a pallet load, front and rear wheel assemblies on each side of said third cart frame, and means for supporting each of said third cart wheel assemblies to make rolling contact with said second track of each track means as said third cart moves along the depth of the storage bay between a forward and a back position, said forward position of said third cart being located at the entry end of said storage bay overlying said second cart, and said back position of said third cart being located four pallets deep from the entry end of said storage bay.

4. A storage rack system according to claim 2 wherein said front wheel assemblies of said second cart are spaced rearwardly of the forward end of said second cart so that said front wheel assemblies of said first cart when said first and second carts are in said forward positions thereof.

5. A storage rack system according to claim 3 wherein said front wheel assemblies of said second cart are spaced rearwardly of the forward end of said second cart so that said front wheel assemblies of said second cart avoid contact with said front wheel assemblies of said first cart when said first and second carts are in said forward positions thereof.

6. In a storage rack system for storing pallet loads multiple pallets deep having a framework providing a plurality of storage bays each of which is defined by a plurality of vertical uprights and horizontal shelf beams, each of said storage bays comprising:

a pair of track means extending from front to back along the depth of said storage bay and being spaced apart across the width of said storage bay, each track means having a channel construction including at least one track provided by an inwardly facing flange for supporting the wheels of a cart, a first cart including a frame providing support for a pallet load, front and rear wheel assemblies on each side of said first cart frame, and means for supporting each of said first cart wheel assemblies to make rolling contact with said one track of each track means as said first cart moves along the depth of the storage bay between a forward and a back position, and a second cart including a frame providing support for a loaded pallet, front and rear wheel assemblies on each side of said second car frame, and means for supporting each of said second cart wheel assemblies to make rolling contact with said track means as said second cart moves along the dept of the storage bay between a forward and a back position, the forward position of said second cart overlying the forward position of said first cart and the back position of said second cart being located a pallet depth rearwardly of the back position of said first cart, said track means being mounted on said storage bay framework so as to be inclined toward the entry end of said storage bay so that carts are supported so that they tend to roll along said track means toward the entry end of said storage bay, said first cart frame including a front frame member, a rear frame member, a pair of side frame members extending along the depth of said first cart between said front and rear frame members and being spaced inwardly of said inwardly facing flanges of said track means, and cart support means including at least one support plate mounted on each side of said first cart frame and extending outwardly therefrom to extend above said track means to prevent said first cart from falling between said track means.

7. A storage rack system according to claim 6 wherein said cart support means includes a second support plate mounted on each side of said first cart frame and extending outwardly therefrom to extend above the track means to prevent said first cart from falling between said track means.

8. A storage track system according to claim 7 wherein said first support plates are mounted near said front frame member and said second support plates are mounted near said rear frame member.

* * * * *